Dec. 8, 1931.    J. H. McCARTHY    1,835,167
GEAR SHIFTING MECHANISM
Filed Jan. 31, 1930    4 Sheets-Sheet 1

INVENTOR
J. H. McCarthy
BY
Munn & Co.
ATTORNEYS

Patented Dec. 8, 1931

1,835,167

UNITED STATES PATENT OFFICE

JOHN H. McCARTHY, OF CHICAGO, ILLINOIS

GEAR SHIFTING MECHANISM

Application filed January 31, 1930. Serial No. 424,927.

My invention relates to improvements in gear shifting mechanisms, and it consists in the combinations, constructions, and arrangements herein described and claimed.

An object of my invention is to provide a gear shifting mechanism which has novel means whereby the gear shifting mechanism of a vehicle may be quickly actuated and easily controlled.

A further object is to provide novel means for automatically selecting and shifting the gears of an automobile.

A further object is to provide a gear shifting mechanism for vehicles whereby the gear positions are preselected.

A further object of my invention is to provide novel means whereby the gear shifting mechanism for vehicles may be controlled from the steering wheel of the vehicle.

A further object is to provide a device which has novel means for preventing the gears from being thrown in or out of mesh while the clutches are in contact.

A further object is to provide a device which has novel means for preventing the gears from clashing when thrown in mesh.

A further object of my invention is to provide a device of the type described which is simple in construction, durable and efficient for the purpose intended.

Other objects and advantages will appear in the following specification, and the novel features of the invention will be particularly pointed out in the appended claims.

My invention is illustrated in the accompanying drawings, forming part of this application, in which Figure 19 is an enlarged detail sectional view of a portion of the selective mechanism, showing one type of sliding valve.

Figure 1:
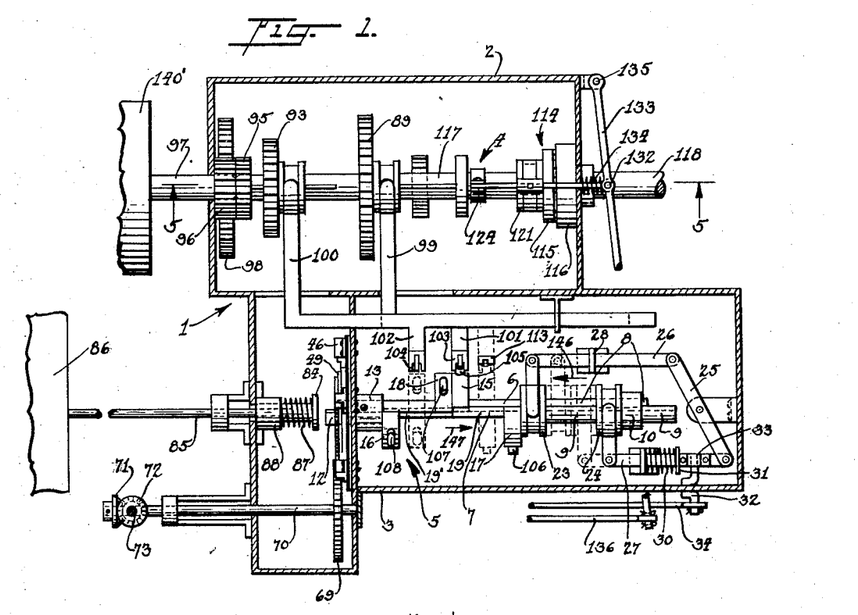
Figure 1 is a top plan view of my device as applied to a vehicle transmission, portions thereof being shown in section.

In carrying out my invention I provide a housing or casing 1, shown in Figure 1, which is composed of portions or compartments 2 and 3. The compartment 2 encases or contains a transmission mechanism 4 of a vehicle, and the compartment 3 encases the gear-shifting actuating mechanism 5. The gear-shifting mechanism comprises two longitudinally extending movable members 6 and 7 disposed in slidable relationship and having a common axis, adapting them to be rotated as a unit. The end portions 8 and 9 of the slidable members 6 and 7, respectively, are oppositely disposed and in combination rotatably mounted in a supporting bearing member 10, and have mutually cooperating and offset engaging portions 11, as shown in Figure 18.

The opposite end portion 12 of the slidable member 6, is slidably disposed in a cylindrical member 13. The end 14 of the slidable member 7 is also disposed in the cylindrical member 13 and is rigidly fastened thereto. An arcuate-shaped or substantially semi-annular flange 15 is disposed on one side of the slidable member 6 and is integral therewith, and a similar flange 16 is similarly disposed on the other side of the slidable member 6 and at a spaced-apart position with respect to the flange 15. A similar flange 17 is disposed upon the slidable member 7 and in an opposite position to that of the flange 15 on the slidable member 6. A similar flange 18 is disposed on the slidable member 7 and in opposite relation to the flange 16 on the slidable member 6.

Figures 6, 14, 15, 16, 17, 18:
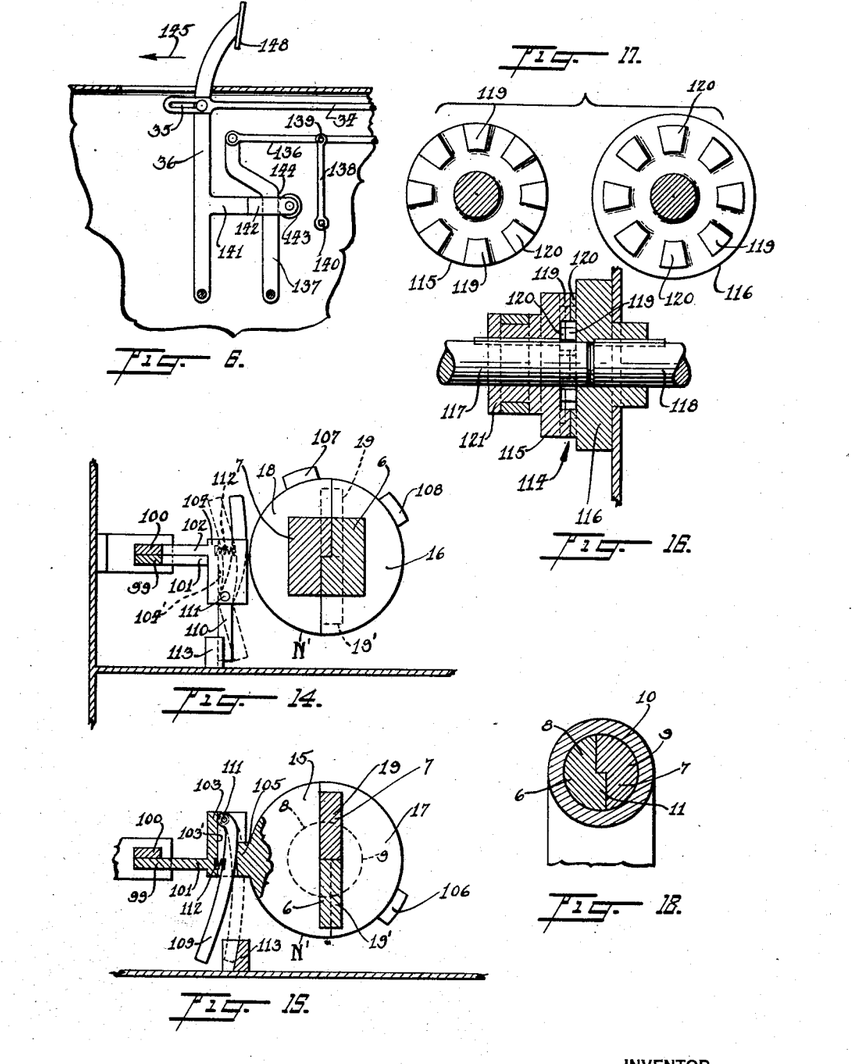
Figure 6 is an elevation of the clutch mechanism used in connection with the device, having portions thereof shown in section.
Figure 14 is an enlarged sectional view taken along the line 14—14 of Figure 10.
Figure 15 is a section along the line 15—15 of Figure 10.
Figure 16 is an enlarged vertical sectional view of the clutch mechanism shown in the gear transmission of Figure 1.
Figure 17 is an elevation of the faces of the clutch plates shown in Figure 16.
Figure 18 is a sectional view taken along the line 18—18 of Figure 10.

A portion 19, which is a part of the slidable member 7, connects the flanges 17 and 18 of the slidable member 7, and is substantially rectangular in cross section as shown in Figure 15. The portion 19 has one end integral with the flange 17, as at 20, and a portion of the other end is integral with the flange 18, as at 21. The remaining portion abuts the flange 16 at 22.

A portion 19', similar to the portion 19, is part of the slidable member 6 and is integral with the flanges 15 and 16 abutting the flange 17.

Collars 23 and 24 are fixedly secured to the slidable members 6 and 7, respectively. A lever 25 is pivotally mounted at its center and has one end pivotally connected to a connecting link 26 which is provided with means for engaging the collar 23 for actuating the same. The other end of the lever 25 is pivotally connected to a connecting link 27 which is provided with means for engaging the collar 24.

A support 28 is provided in the casing portion 3 in which the connecting link 26 is slidably mounted. A similar support 29 is provided for the connecting link 27. The link 27 is provided with a compression spring 30 which is disposed between the support 29 and a member 31 which is rigidly attached to the link 27. A crank 32 has one end disposed in a bearing 33 which is rigidly secured to the link 27. One end of an actuating rod 34 is disposed upon the other end of the crank 32 and is provided with a slot 35 whereby it may be slidably connected to a clutch-actuating lever 36.

The cylindrical member 13, with which the slidable members 6 and 7 are associated, is disposed in a plate 37 which may be a part of a wall of the casing and acts as a bearing and supporting means for the cylindrical member. The plate 37 is provided with a plurality of equally spaced-apart openings or apertures 38 which are disposed on the circumference of the opening 39 in which the cylindrical member 13 is slidably and, under certain conditions hereinafter described, rotatably mounted. Sliding valve members 40 are disposed adjacent the plate 37 and adapted to close the openings 38.

The sliding valve members 40 are provided with flanges 41. The bearing plate 37 has superimposed plates 42 and 43 which contain and slidably hold the flanges 41 of the sliding valve members. The plates 42 and 43 have the same apertures 38 and opening 39, in which the cylindrical member 13 is disposed, as has the plate 37.

A flange or projection 44 is disposed on the cylindrical member 13 and may be integral therewith. The flange 44 is provided with a slight bevel 44' on the inner rear edge of its rotating direction to facilitate its sliding into the opening 38 when the sliding valve members are actuated to permit the apertures 38 to be opened. Springs 45 are associated with the sliding valve members and are enclosed by casing members 46 which are attached to either or all of the plates 37, 42, and 43. A circular flange 47 is disposed on the plate 43 and has its inner circumference 48 at a distance from the cylindrical member 13 equal to the height of the flange 44, in order that the cylindrical member 13 may be rotated when the flange 44 is without the openings 38.

Figure 2:
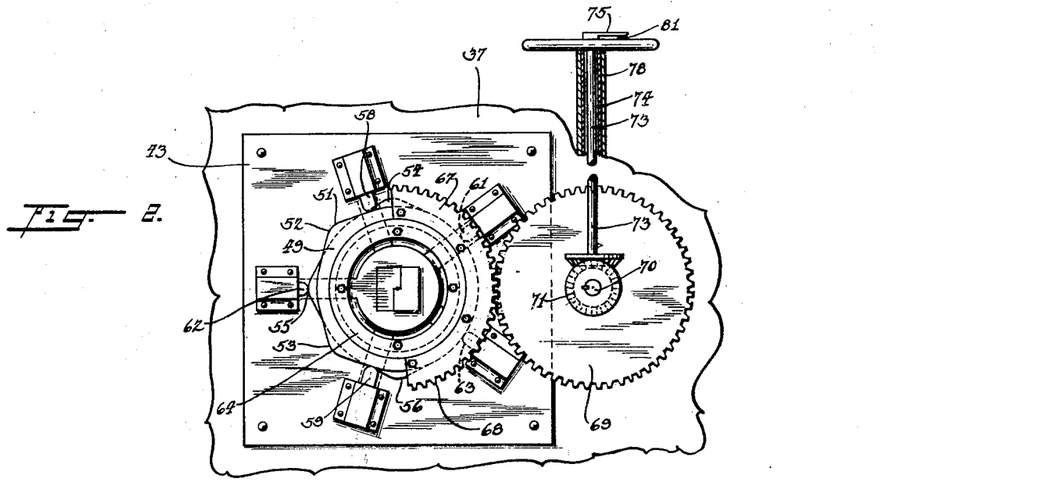
Figure 2 is an elevation of the selective mechanism with a portion shown in section.
Figure 3:
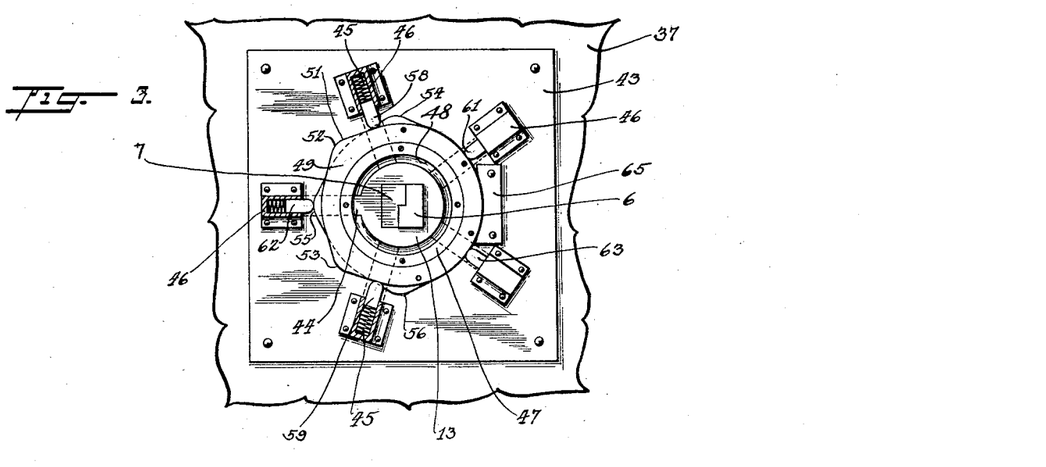
Figure 3 is a view of a portion of the selective mechanism showing the cam part of the selective mechanism with portions shown in section.

A cam plate 49 is rotatably mounted upon the outer circumference 50 of the circular flange 47. As seen in Figure 2, the cam plate 49 has a plurality of cam projecting portions or surfaces 51, equal in number to that of the sliding valve members 40, and arranged so that only one cam projection will come into engagement with any of the valve members at one time, and therefore only one of the apertures 38 will be opened at one time by the sliding valves for receiving the projection 44 of the cylindrical member 13.

Cam projections 52 and 53 are disposed adjacent the outer face of the cam plate 49, and projections 54, 55, and 56 are disposed adjacent the inner face of the cam plate. The cam projections 52 and 53 are adapted to operatively and exclusively engage projections 57 of sliding valves 58 and 59, respectively, and the cam projections 54, 55, and 56 are adapted to operatively and exclusively engage projections 60 of sliding valves 61, 62, and 63, respectively. The valves 58 and 61 are the neutral and reverse speed control valves respectively, and the valves 62, 59, and 63 are the first, second and third speed control valves respectively. When the cam plate is rotated, the cam projections 52 and 53 are adapted to pass by the valve 62 without actuating it, and in a like manner the projections 54, 55, and 56 will pass by the valves 58 and 59 without actuating them.

A retaining plate 64 is fixedly attached to the face of the circular flange 47 and projects over a portion of the cam plate 49 for holding the cam plate in place. A stationary plate member 65 is rigidly secured to either or all of the plates 37, 42, and 43 and has an arcuate-shaped side 66 corresponding to a portion of the contour of the cam plate 49 and disposed adjacent thereto. The plate member 65 provides an abutment for the projections 54 and 56 when the cam plate is located sufficiently to permit the projections 54 and 56 to come into engagement therewith, thereby limiting the rotation of the cam plate 49. An arcuate-shaped actuating plate 67 is rigidly attached to the cam plate 49 and has its periphery provided with gear teeth 68 which engage with a gear wheel 69, fixedly disposed on a rotatable shaft 70. The shaft 70 is provided with a bevel gear 71, fixedly attached to one end thereof, which is in mesh with another bevel gear 72 rigidly attached to one end of a rotatable shaft 73. The shaft 73 is disposed adjacent a steering mechanism 74 of a vehicle and has a manually actuated handle 75 rigidly attached to its opposite end thereof, adjacent a steering wheel 76 of a vehicle.

A speed or gear-position indicating means 77 is fixedly attached to a supporting member 78 of the steering wheel 76 and is provided with markings 79 to indicate the gear positions. A handle 75 is provided with a projection 81 for engaging grooves 82, cut on the face of the indicating means 77, to enable the operator to ascertain by his sense of touch when the handle is in the desired position. The indicating means is also provided with projections 83 at its extremities and adjacent its extreme gear-speed markings or engaging the handle projection 81, thereby limiting the rotation of the handle projection. A continuously rotating plate or cylinder-actuating member 84 is disposed adjacent the cylindrical member 13 and is arranged to yieldingly and frictionally engage the cylindrical member when the cylindrical member is extended to come into engagement therewith. The direction of rotation of the member 84 is immaterial.

The rotating member 84 is slidably disposed on a shaft 85 which may be connected to any rotating mechanism such as the fan shaft of a vehicle engine 86. A compression spring 87 is disposed between the rotating member 84 and a member 88 for holding the rotating member 84 and the cylindrical member 13 in positive frictional engagement when said members are in contact.

In the transmission mechanism a sliding gear 89 is adapted to mesh with a reverse speed gear 90 and a first forward speed gear 91 of an auxiliary shaft 92, and a sliding gear 93 is adapted to externally mesh with a second speed forward gear 94 and to internally mesh with a third speed or direct drive gear 95. A gear 96 of a main drive shaft 97 is in mesh with an auxiliary shaft driving gear 98.

Slidable rods or bars 99 and 100 are slidably disposed adjacent the casing 1 and are operatively connected to the sliding gears 89 and 93, respectively, of the transmission mechanism 4. The slidable bars 99 and 100 are provided with offset projecting portions 101 and 102, respectively. The projecting portions 101 and 102 are provided with U-shaped or flange-engaging end portions 103 and 104, respectively. The flange-engaging member 103 is provided with a recess 103' adapted to receive and hold in operative engagement therewith projecting or protruding flanges 105 and 106 of the arcuate-shaped sliding flanges 15 and 17, respectively, and in like manner the flange-engaging member 104 is provided with a recess 104' adapted to receive and hold in operative engagement therewith projecting flanges 107 and 108 of the arcuate-shaped sliding flanges 18 and 16, respectively.

The U-shaped engaging portions 103 and 104 of the slidable members 99 and 100 have arms or levers 109 and 110, respectively, disposed adjacent the recesses thereof. The levers are pivotally mounted at 111 and have compression springs 112 disposed between their inner sides and the rear walls of the recesses which tend to force the lever arms outwardly into the recesses. The lower extremities of the levers 109 and 110 are receivable in recessed retaining or stationary members 113, which hold the levers 109 and 110 in locking engagement therewith, thereby holding the slidable bars 99 and 100 against movement excepting when the several projecting flanges associated with the slidable flanges come into engagement with the levers 99 and 100.

The gear transmission 4 is provided with a clutch mechanism 114 comprising two plates 115 and 116. The plate 115 is slidably mounted on the main transmission shaft 117, and the plate 116 is rigidly mounted to the main driven shaft 118. The faces of the plates 115 and 116 are provided with alternating high and low projecting portions 119 and 120, respectively, which are of uniform width and are spaced apart and adjacent the circumferences thereof. The spaces and projections are all of the uniform width thus permitting the projections to occupy the spaces.

One end of an arm 121 is in operative engagement with a collar 122 attached to the movable plate 115, and the other end is rigidly connected to a rod 123. One end of the rod 123 is pivotally connected at 124 to a transmission braking lever 125 of a transmisson braking mechanism 126. The braking mechanism 126 comprises a lever member 125 loosely disposed about the main transmission shaft 117 and having a bifurcated end portion 127 disposed on the auxiliary shaft 92.

A bearing or supporting member 128 is disposed in the casing 2 and acts as a fulcrum for the lever member 125. The auxiliary transmission shaft 92 and the main transmission shaft 117 have frictional plates 129 and 130, respectively, rigidly secured thereto, which have surfaces 131 for frictionally engaging the lever member 125. The rod 123 has its opposite end pivotally connected at 132 to a lever arm 133 and has a spring 134 disposed between the pivotal connection 132 and the casing 2. The lever arm 133 has one end pivotally connected at 135 to a projection on the side of the casing 2 and its other end operatively connected to one end of an actuating rod 136. The actuating rod 136 has its other end pivotally connected to a supplementary clutch lever 137. A connecting link 138 has one end pivotally attached to the actuating rod 136 at 139 and the other end rigidly secured to the main clutch actuating arm member 140.

The clutch actuating lever 36 has an extending arm 141 which has an offset portion 142. The offset arm 142 is provided with a roller or wheel 143, rotatably attached thereto and in operative engagement with the edge 144 of the supplementary clutch lever 137.

Figure 4:
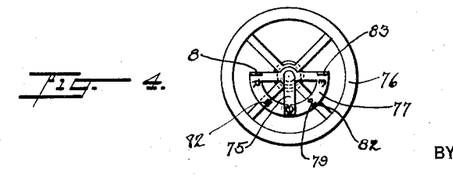
Figure 4 is a top plan view of a steering wheel with the device applied thereto.
Figures 5, 7:
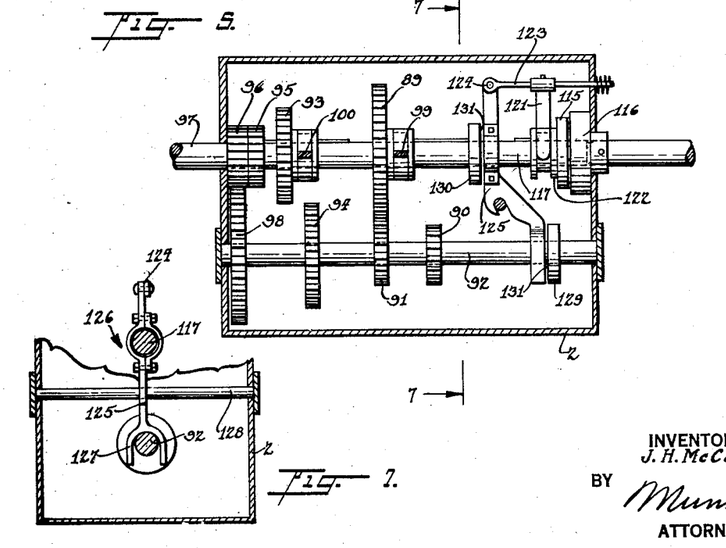
Figure 5 is a vertical sectional view of the transmission mechanism taken along the line 5—5 of Figure 1, portions thereof being shown in elevation.
Figure 7 is a section along the line 7—7 of Figure 5.

From the foregoing description of the various parts of the device, the operation thereof may be readily understood. Let it be assumed that the operator of the vehicle wishes to put the vehicle in low or first speed position shown in Figure 1. The handle 75 is first moved to the position shown in Figure 4 so that the handle projection 81 engages the groove, on the indicating means 77, at "1". The movement is imparted to the cam plate 49 by means of the association of the gear plate 67, the gear wheel 69, the bevel gears 71 and 72, and the shafts 70 and 73. The cam plate is thus rotated until the cam projection 55 comes into engagement with the valve projection 60 of the valve 62, thereby opening the aperture 38.

The flange 44, on the cylinder 13, may, as far as the operation has thus far proceeded, be contained in any of the apertures opposite the other sliding valves. Thus it will be seen that while the vehicle is operating in one speed, the next desired speed may be selected by actuating the speed-selecting mechanism without actuating the gear shifting mechanism.

In continuing the operation the clutch lever 148, in Figure 6, is pushed forward in the direction of the arrow 145. As the lever 148 advances, the auxiliary lever 137 is pulled in the same direction, thereby pulling on the rod 136. The rod 136, during this movement, serves to release the main clutch 140' and the supplementary clutch 114, shown in Figure 1. The rod 136 also actuates the transmission braking mechanism 126 which instantly tends to reduce the speed of rotation of the transmission gears when the clutches are released.

When the clutches and transmission braking mechanism have been actuated, the roller 143, see Figure 6, rides over the shoulder of the auxiliary clutch lever so that the auxiliary clutch lever ceases to move forwardly. At the same time the clutch lever 36 has reached the end of the slot 35 and the continued movement forward of the clutch lever 36 pulls the rod 34 forwardly.

Figures 9, 10, 12, 13, 14:
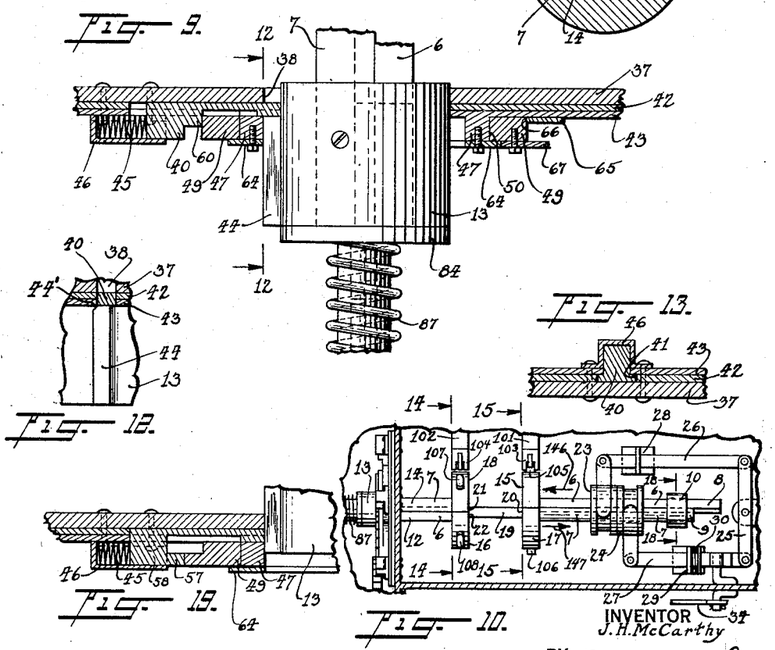
Figure 9 is an enlarged sectional detail view of a portion of the selective mechanism, showing its selective position and having parts shown in elevation.
Figure 10 is a portion of the gear actuating mechanism, shown in Figure 1, when in its selective position.
Figure 12 is a section taken along the line 12—12 of Figure 9.
Figure 13 is a section taken along the line 13—13 of Figure 8.

The rod 34 in being operatively connected to the sliding members 6 and 7 actuates them until they assume the positions similar to those shown in Figure 10. At this time the semiannular flanges 15 and 17 and also 16 and 18 are positioned opposite to each other. The projecting flanges 105 and 106 of the annular flanges 15 and 17, respectively, align with the U-shaped engaging portions 103, and the projecting flanges 107 and 108 of the annular flanges 18 and 16, respectively, align with the U-shaped engaging portion 104 as shown in Figure 10. During this movement, the annular flanges 15 and 16, being integral with the slidable member 6, move in the direction of the arrow 146 and the annular flanges 17 and 18, being integral with the slidable member 7, move in the direction of the arrow 147, as shown in Figure 1.

The cylindrical member 13 moves in the same direction as the slidable member 7, being fixedly attached thereto, until said cylindrical member comes into frictional engagement with the continuously rotating member 84, at which time the flange 44 is without the aperture it was contained in, thereby permitting the cylindrical member 13 to rotate in sympathy with the member 84, as shown in Figure 9. When the flange leaves the aperture it was contained in, the valve for that aperture automatically closes and can only be opened again by actuating the handle 75. The cylindrical member 13 is now free to rotate.

When the clutch lever 36 is in the first stage of its return by reason of the spring 30, it tends to return the slidable semiannular flanges to positions similar to those shown in Figure 1. The cylindrical member 13 and the semiannular flanges rotate in unison until the flange 44 engages the edge of the apertures 38 which the valve 62 has opened, and is pulled therein by the action of the spring 30.

Figures 8, 11:
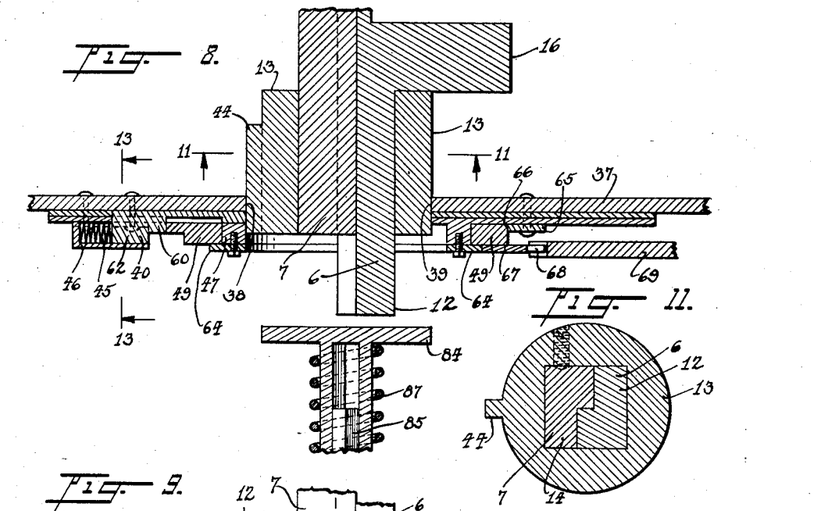
Figure 8 is an enlarged detail sectional view of the selective mechanism shown in Figure 2.
Figure 11 is a section along the line 11—11 of Figure 8.

When the flange 44 is at the point of entering the aperture 38, the projecting flange 105 of the semiannular flange 15, automatically releases the locking lever 109 by being in engagement with the U-shaped portion 103 of the slidable bar 99. It will be seen that as the cylinder 13 moves into its locking position shown in Figure 8, the semi-annular flange 15 having the projecting flange 105 moves to the position shown in Figure 1 thereby actuating the sliding bar 99 which in turn moves the gears 89 and 91 into full mesh, which is the first speed position.

It will be observed that the transmission braking mechanism will so decrease the momentum of the transmission mechanism that the meshing of the gears will be comparatively noiseless.

Up to this period, the clutches are not in mesh as the auxiliary clutch lever has not moved. During the second stage of the return to the operative position, the auxiliary clutch lever is pulled back to its normal position by the action of the spring 134, in Figure 1, on the lever arm 133, thereby permitting the engagement of the clutch mechanisms and the release of the transmission braking mechanism. The transmission braking mechanism and the clutches may be so adjusted as to permit the clutches to be released slightly prior to the braking action of the braking mechanism, and to release the braking action slightly prior to the clutches reengaging.

If it is now desired to put the mechanism in neutral, the handle 75 is turned to the letter "N" on the indicating member 77. This actuates the valve 58 which opens the aperture adjacent thereto in the manner heretofore described. The change of speeds is not affected, however, until the clutch pedal 148 is actuated, thereby causing the flange 44 to fly out of the first speed aperture and rotate until it encounters and slides into the neutral speed aperture.

It will be observed that when the shifting mechanism is in neutral, the blank portions N', see Figures 14 and 15, of the semiannular flanges will be disposed opposite to the U-shaped ends of the sliding bars 99 and 100. It will be noted, by viewing Figures 14 and 15, that the sliding bars 99 and 100 can operate in two directions, but only one of the bars can be actuated at one time and neither of them are actuated when the mechanism is in neutral. Thus it will be seen that any speed may be selected while operating in any other speed, the change being effected by merely kicking the clutch pedal.

It will be noted that the transmission described is the well known standard sliding gear type, and that the gear shift herein specified is adapted to be used in combination with that type of transmission.

I claim:

1. The combination with a transmission mechanism including gears, of a gear shifting device comprising a shaft rotatably and slidably mounted and split for providing complementary portions movable with respect to each other, means for rotatively positioning the complementary portions, means for operatively connecting the portions when properly positioned with the gears, and means for sliding the portions whereby the gears may be shifted.

2. The combination with a transmission mechanism including gears, of a gear shifting device comprising a shaft rotatably and slidably mounted and split for providing complementary portions movable with respect to each other, means for rotatively positioning the complementary portions, movable means connected with the gears, means carried by the portions and adapted for operative engagement with the movable means when the portions are rotatably positioned, and means for sliding the portions whereby the movable means may be actuated for shifting the gears.

3. The combination with a transmission mechanism including gears, of a gear shifting device comprising a shaft rotatably and slidably mounted and split for providing complementary portions movable with respect to each other, means for preselecting the rotative position of the complementary portions, means for rotating the shaft whereby the complementary portions may be disposed in their preselected positions, means for operatively connecting the complementary portions when properly positioned with the gears, and means for sliding the portions whereby the gears may be shifted.

4. The combination with a transmission mechanism including gears, of a gear shifting device comprising a shaft rotatably and slidably mounted and split for providing complementary portions movable with respect to each other, means for preselecting the rotative position of the complementary portions, means for rotating the shaft whereby the complementary portions may be disposed in their preselected positions, means for operatively connecting the complementary portions when properly positioned with the gears, and means operatively connecting a clutch means with the complementary portions whereby said portions may be moved for shifting the gears when the clutch means is actuated.

5. The combination with a transmission mechanism including gears, of a gear shifting device comprising a shaft rotatably and slidably mounted and split for providing a pair of complementary portions, said complementary portions being movable in opposite directions simultaneously, means for rotatively positioning the complementary portions, means for operatively connecting the portions when properly positioned with the gears, and means for sliding the portions whereby the gears may be shifted.

6. The combination with a transmission mechanism including gears, of a gear shifting device comprising a shaft rotatably and slidably mounted and split for providing a pair of complementary portions, said complementary portions being movable in opposite directions simultaneously, means for rotatively positioning the complementary portions, movable means connected with the gears, means carried by the portions and adapted for operative engagement with the movable means when the portions are rotatably positioned, and means for sliding the portions whereby the movable means may be actuated for shifting the gears.

7. The combination with a transmission mechanism including gears, of a gear shifting device comprising a shaft rotatably and slidably mounted and split for providing a pair of complementary portions, said complementary portions being movable in opposite directions simultaneously, means for preselecting the rotative position of the complementary portions, means for rotating the shaft whereby the complementary portions may be disposed in their preselected positions, means for operatively connecting the complementary portions when properly positioned with the gears, and means for sliding the portions whereby the gears may be shifted.

8. The combination with a transmission mechanism including gears, of a gear shifting device comprising a shaft rotatably and slidably mounted and split for providing a pair of complementary portions, said complementary portions being movable in opposite directions simultaneously, means for preselecting the rotative position of the complementary portions, means for rotating the shaft whereby the complementary portions may be disposed in their preselected positions, means for operatively connecting the complementary portions when properly positioned with the gears, and means operatively connecting a clutch means with the complementary portions whereby said portions may be moved for shifting the gears when the clutch means is actuated.

9. The combination with a transmission mechanism including gears, of a gear shifting device comprising a shaft rotatably and slidably mounted and split for providing complementary portions movable with respect to each other, means for supporting said split shaft, means mounted on said supporting means and operatively associated with said split shaft whereby the complementary portions may be rotatably positioned, means for operatively connecting the complementary portions when properly positioned with the gears, and means for sliding the portions whereby the gears may be shifted.

10. The combination with a transmission mechanism including gears, of a gear shifting device comprising a shaft rotatably and slidably mounted and split for providing a pair of complementary portions, said complementary portions being movable in opposite directions simultaneously, means for supporting said split shaft, means mounted on said supporting means and operatively associated with said split shaft whereby the complementary portions may be rotatably positioned, means for operatively connecting the complementary portions when properly positioned with the gears, and means for sliding the portions whereby the gears may be shifted.

11. The combination with a transmission mechanism including gears, of a gear shifting device comprising a shaft rotatably and slidably mounted and split for providing complementary portions movable with respect to each other, means for supporting said split shaft, means mounted on said supporting means and operatively associated with said split shaft whereby the complementary portions may be rotatably positioned, movable means connected with the gears, means carried by the portions and adapted for operative engagement with the movable means when the portions are rotatably positioned, and means for sliding the portions whereby the movable means may be actuated for shifting the gears.

12. The combination with a transmission mechanism including gears, of a gear shifting device comprising a shaft rotatably and slidably mounted and split for providing complementary portions movable with respect to each other, means for supporting said split shaft, means mounted on said supporting means and operatively associated with said split shaft whereby the complementary portions may be rotatably positioned, means for preselecting the rotative position of the complementary portions, means for rotating the shaft whereby the complementary portions may be disposed in their preselected positions, means for operatively connecting the complementary portions when properly positioned with the gears, and means for sliding the portions whereby the gears may be shifted.

13. The combination with a transmission mechanism including gears, of a gear shifting device comprising a shaft rotatably and slidably mounted and split for providing complementary portions movable with respect to each other, means for supporting said split shaft, means mounted on said supporting means and operatively associated with said split shaft whereby the complementary portions may be rotatably positioned, means for preselecting the rotative position of the complementary portions, means for rotating the shaft whereby the complementary portions may be disposed in their preselected positions, means for operatively connecting the complementary portions when properly positioned with the gears, and means operatively connecting a clutch means with the complementary portions whereby said portions may be moved for shifting the gears when the clutch means is actuated.

14. The combination with a transmission mechanism including gears, of a gear shifting device comprising a shaft rotatably and slidably mounted and split for providing a pair of complementary portions, said complementary portions being movable in opposite directions simultaneously, means for supporting said split shaft, means mounted on said supporting means and operatively associated with said split shaft whereby the complementary portions may be rotatably positioned, movable means connected with the gears, means carried by the portions and adapted for operative engagement with the movable means when the portions are rotatably positioned, and means for sliding the portions whereby the movable means may be actuated for shifting the gears.

15. The combination with a transmission mechanism including gears, of a gear shifting device comprising a shaft rotatably and slidably mounted and split for providing a pair of complementary portions, said complementary portions being movable in opposite directions simultaneously, means for supporting said split shaft, means mounted on said supporting means and operatively associated with said split shaft whereby the complementary portions may be rotatably positioned, means for preselecting the rotative position of the complementary portions, means for rotating the shaft whereby the complementary portions may be disposed in their preselected positions, means for operatively connecting the complementary portions when properly positioned with the gears, and means for sliding the portions whereby the gears may be shifted.

16. The combination with a transmission mechanism including gears, of a gear shifting device comprising a shaft rotatably and slidably mounted and split for providing a pair of complementary portions, said complementary portions being movable in opposite directions simultaneously, means for supporting said split shaft, means mounted on said supporting means and operatively associated with said split shaft whereby the complementary portions may be rotatably positioned, means for preselecting the rotative position of the complementary portions, means for rotating the shaft whereby the complementary portions may be disposed in their preselected positions, means for operatively connecting the complementary portions when properly positioned with the gears, and means operatively connecting a clutch means with the complementary portions whereby said portions may be moved for shifting the gears when the clutch means is actuated.

17. A device of the type described comprising a transmission mechanism including gears, a clutch disposed between the transmission mechanism and a driving shaft, an auxiliary clutch disposed between the transmission and a driven shaft, means for actuating said clutches, a transmission braking mechanism, means associated with the clutch actuating mechanism for operating the braking mechanism, a gear shifting mechanism associated with the transmission mechanism, said gear shifting mechanism comprising complementary movable members, movable arms associated with the transmission movable gears, said complementary movable members being provided with means for operatively engaging and disengaging said movable arms, supporting members disposed at each end of the movable members and adapted to rotatably receive the ends of the movable members, one of the supporting members being provided with means for rotatably positioning said movable members when said movable members are actuated, means associated with the positioning means for predetermining the rotative position of the movable members, a gear-shifting actuating means associated with the clutch actuating means, and means associated with the movable members for rotating them when the clutch actuating mechanism is operated.

Signed at Chicago, in the county of Cook, and State of Illinois, this 28th day of January, A. D. 1930.

JOHN H. McCARTHY.